Sept. 1, 1953  C. H. ADAMS  2,650,432
ROLLING CONTACT EXTENSOMETER
Filed Jan. 26, 1949  2 Sheets-Sheet 1

INVENTOR.
CHARLES HOWARD ADAMS
BY Robert M. Dickey
attorney

Patented Sept. 1, 1953

2,650,432

UNITED STATES PATENT OFFICE 2,650,432

ROLLING CONTACT EXTENSOMETER

Charles Howard Adams, Springfield, Mass., assignor to Monsanto Chemical Company, St. Louis, Mo., a corporation of Delaware Application January 26, 1949, Serial No. 72,847

3 Claims. (Cl. 33—129)

This invention relates to an apparatus for measuring the true strain in extensible materials. More particularly, the invention relates to an apparatus for obtaining precision measurement of the elongation of extensible materials when said materials are loaded in tension.

Strain is defined as a deformation resulting from stress, and it is generally determined by measuring the increase in length per unit length of the extensible material. The determination of strain is particularly valuable in the plastics, rubber, textile and allied industries to determine the quality of the various products, to determine applicability of the products to various uses, and to determine fundamental properties related to molecular structure of these materials. Previous apparatus used to determine strain has depended to a great extent upon the skill of the operator for obtaining accurate results, and even with a skilled operator, the average error involved in measuring the elongation of an elastomeric film may be as much as 25%. Furthermore, the results obtained using the previous apparatus have been affected by the clamping force necessary to hold the measuring means on the test piece.

It is an object of this invention to provide an extensometer for measuring the strain of extensible materials.

A further object is to provide an extensometer which is independent of the skill of the operator.

These and other objects are attained by measuring the elongation of extensible materials by means of a pair of rotatable wheels.

The apparatus and methods of this invention may be more easily understood by reference to the figures in which.

Figure 3:
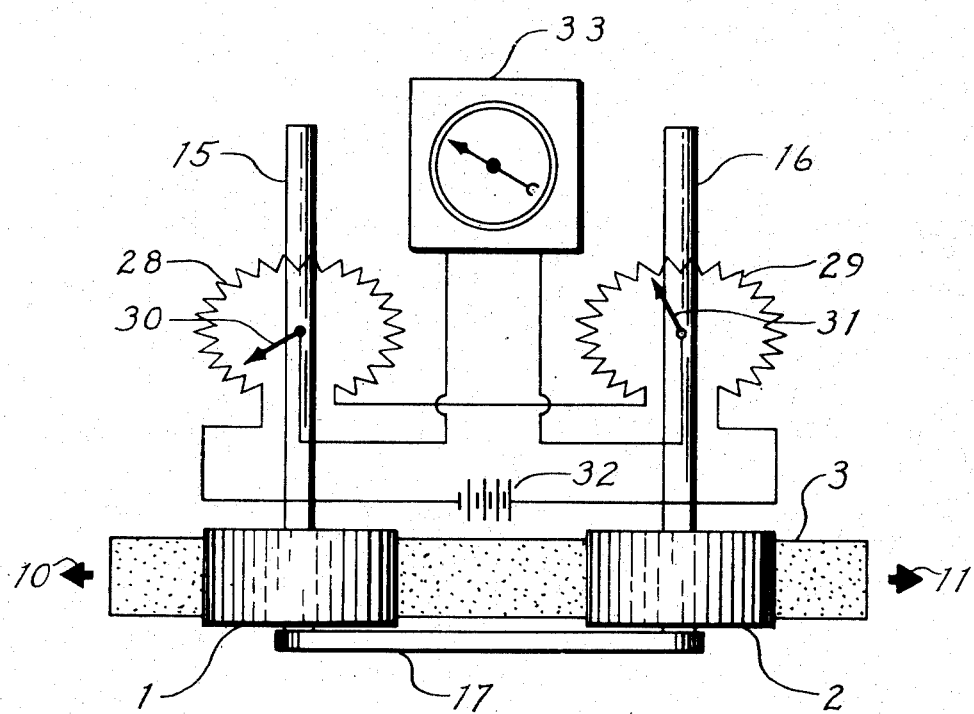
Figure 3 is a diagrammatic top plan view of a further embodiment.
Figure 1:
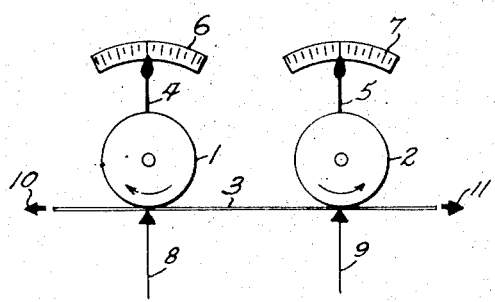
Figure 1 is a diagrammatic view of the apparatus of the invention.

Referring to the figures, 1 and 2 represent freely rotatable wheels, 3 is an extensible material, 4 and 5 are indicators cooperating respectively with scales 6 and 7. Arrows 8 and 9 indicate a force operating on extensible material 3 and arrows 10 and 11 represent a load on the ends thereof.

In the operation of the apparatus, wheels 1 and 2 are separated from each other by a fixed distance. Web 3 is placed below wheels 1 and 2 and is maintained in non-slipping contact therewith by forces 8 and 9. Predetermined loads 10 and 11 are then applied to the ends of web 3 at a fixed rate. The extensible material is elongated by the applied loads causing wheels 1 and 2 to turn in the directions of the arrows. Indicators 4 and 5 cooperate with wheels 1 and 2 and move along scales 6 and 7 registering thereon the relative elongation of web 3.

Figure 2:
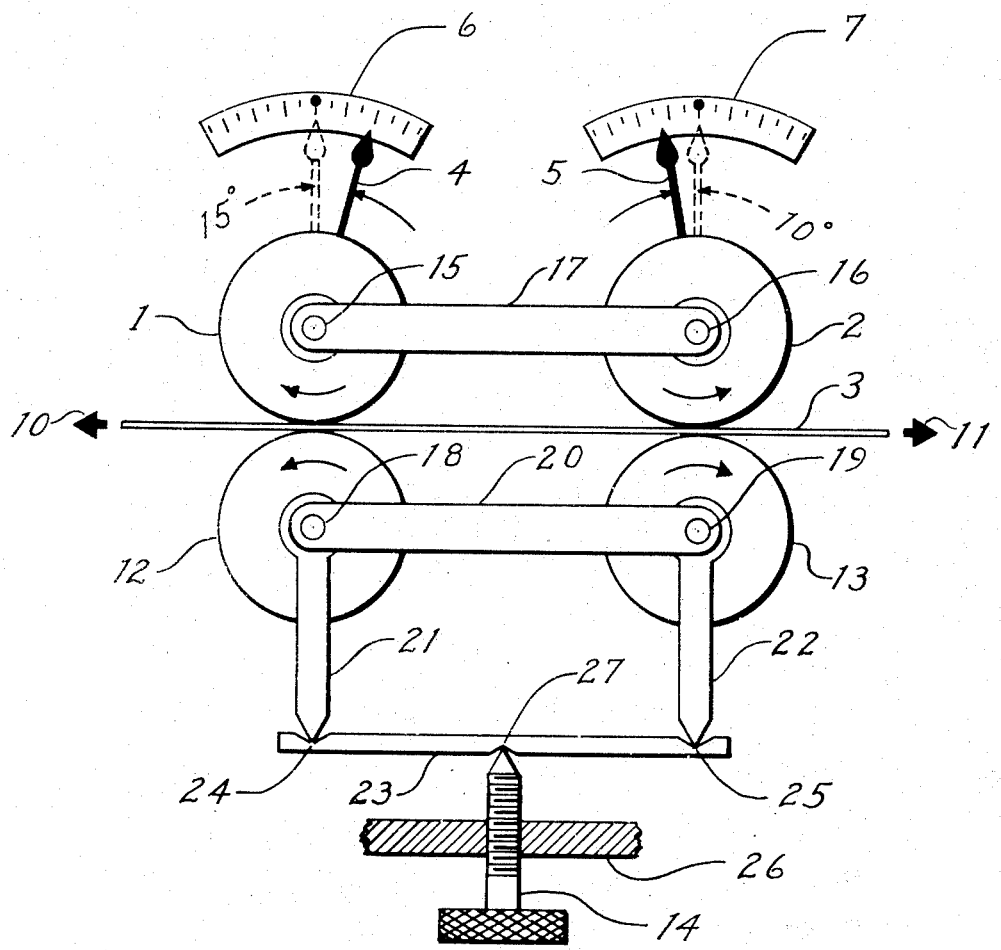
Figure 2 is a front elevation of a preferred embodiment of the invention.

In a preferred embodiment of this invention shown in Figure 2, forces 8 and 9 are applied by a pair of idler wheels, 12 and 13, which are adjusted towards or away from wheels 1 and 2 by means of adjustable screw 14.

In more detail, as shown in Figure 2, measuring wheels 1 and 2 are arranged in tandem alignment in a single plane at right angles to their axes of rotation. Each wheel is fixedly mounted on shafts, 15 and 16, respectively, the rotational axes of which are identical with the rotational axes of the wheels 1 and 2. Rigid bar, 17, of fixed dimensions is attached to shafts 15 and 16 through frictionless bearings, not shown, and serves to prevent the wheels from being displaced by the elongation of the extensible material. Indicators 4 and 5 are fixedly mounted on shafts 15 and 16. Scales 6 and 7 are graduated in degrees of rotation.

Idler wheels 12 and 13 are in tandem alignment in a single plane, said plane being identical with that of the measuring wheels 1 and 2. The idler wheels are located exactly opposite the measuring wheels. They are fixedly mounted on shafts 18 and 19, respectively, whose rotational axes are identical with the rotational axes of the idler wheels. Rigid bar 20 separates idler wheels 12 and 13 and is attached to the shafts thereof through frictionless bearings, not shown. Bar 20 is preferably, but not necessarily, identical in length to bar 17 so that the distance between the axes of rotation of the idler wheels is the same as that between the measuring wheels.

Arms 21 and 22 are mounted on shafts 18 and 19 through frictionless bearings not shown. They impinge upon crossbar 23 at points 24 and 25. Arms 21 and 22 in conjunction with bar 23 serve as a means for transmitting the force exerted by adjustable screw 14 to the idler wheels. Screw 14 passes through a threaded, fixedly mounted member 26 and acts on bar 23 at point 27. This arrangement of framework and adjustable screw is an efficient and simple means for adjusting the pressure on the idler wheels so that they maintain sufficient pressure on extensible web 3 to keep it in non-slipping contact with measuring wheels 1 and 2.

In the operation of the preferred embodiment of the invention, a web or sheet of extensible material is placed between measuring wheels 1 and 2 and idler wheels 12 and 13. The ends of the web extend beyond the measuring wheels and are clamped to a suitable loading device not shown. The distance between the point of tangency of the web with wheel 1 and the point of tangency of the web with wheel 2 is accurately measured before elongation starts. Indicators 4 and 5 are set at zero on scales 6 and 7 by rotating wheels 1 and 2. Idler wheels 12 and 13 are now moved into contact with the web 3 by means of adjustable screw 14, just enough pressure being applied to maintain web 3 in non-slipping contact with wheels 1 and 2. A load is then applied to the ends of the web which elongates the web. The elongation causes wheels 1 and 2 to turn, actuating indicators 4 and 5. As the indicators move along scales 6 and 7, the angle of rotation of each wheel can be read at a glance and simple calculations used to convert the angular displacement of the wheels into units of "true" strain or, if desired, ordinary strain.

In a further embodiment of the invention the load applied to the web may be applied at only one end, the other end remaining fixed. Under such conditions, the scale readings must be subtracted one from the other to obtain the elongation of the web instead of being added as is the case when the load is applied to both ends of the web.

The wheels to be used in this invention should have faces of substantial width, i. e., wheels having faces which are a hair line or a knife edge might tend to cut or otherwise deform the extensible material thus adding undesirable variables to the test. The diameter of the measuring wheels may be varied over a wide range and will generally be somewhat larger for soft materials than for very hard materials. The distance between the measuring wheels may also be widely varied. For most purposes, they will be almost touching although for very hard materials having little extensibility, it is preferable to separate them by greater distances so that the measurements will be larger and less susceptible to error.

Under normal circumstances, the idler wheels will be of exactly the same dimensions as the measuring wheels, and their axes will be separated by the same distance. However, since they merely serve the purpose of applying a force on the material being tested, they may be quite different in size and shape from the measuring wheels with the restriction that their faces must be of substantial width to avoid introduction of unwanted variables.

In Figure 2, the apparatus has been shown in a horizontal position as a matter of convenience. It may be arranged vertically or at any desired angle between horizontal and vertical. In fact, one of the conventional methods for applying a load to extensible material is by means of a tilting table apparatus. In such an arrangement, the wheels of this invention would start the test in a horizontal position, but end up at a decided angle from the horizontal. However, as a matter of practical convenience of operation, the apparatus of this invention will usually be mounted vertically.

The indicating means and scales shown in Figure 2 may be replaced by any of the conventional means for measuring the rotation of rotatable objects. For example, the shafts of the measuring wheels may be connected mechanically to various types of indicating means including continuous recording apparatus as by the use of a planetary gear system cooperating with a single calibrated scale or with a continuous recording chart. The shafts may also be connected by various electrical devices to calibrated scales or continuous recording devices as by the use of a system of Selsyn motors.

A simple electrical indicating means is illustrated in Figure 3 wherein 28 and 29 each represents the resistance element of a potentiometer, 30 and 31 are the sliding contact elements thereof, 33 is a galvanometer, and 32 is a source of direct current. Elements 28 and 29 are, respectively, positioned around shafts 15 and 16 in a plane perpendicular to the longitudinal axes of the shafts, and sliding contact elements 30 and 31 are fixedly mounted on shafts 15 and 16, respectively. The two potentiometers are electrically connected to galvanometer 33 which may be calibrated in units of true strain if desired, or it may be tied in with continuous recording apparatus, not shown.

In the operation of the apparatus of this invention, the load is applied to the extensible material at a point or points somewhat removed from the field of actual measurement, thus eliminating variables due to pressure exerted by the clamps or jaws of the loading devices. In addition, the apparatus provides a method for instantly determining the strain at any point or at a series of points during the test by merely reading the elongation on a scale or scales. Furthermore, by using continuous recording devices, it makes it possible to obtain a record of the strain throughout the test and to obtain the modulus of elasticity of the specimen with unusual accuracy.

It is obvious that many variations may be made in the apparatus of this invention without departing from the spirit and scope thereof as defined in the appended claims.

What is claimed is:

1. In an apparatus of the class described including a pair of spaced loading members for elongating an extensible material suspended therebetween, means for measuring strain imparted to an extensible material suspended between said loading members on elongation of said material comprising a pair of spaced rotatable measuring wheels intermediate said loading members, said measuring wheels being in tandem alignment in a single plane perpendicular to the axes of rotation thereof and having faces engageable with said extensible material, said faces being of a width sufficient to prevent deformation of extensible material engaged thereby, a pair of bearing elements positioned, respectively, exactly opposite said faces of said measuring wheels, each of said bearing elements having a bearing surface engageable with said extensible material on the side opposite the side with which the face of the corresponding measuring wheel is engageable, said bearing surfaces during measuring operations being spaced from said faces of said measuring wheels a distance such that the extensible material therebetween is held in non-slipping contact with said faces of said measuring wheels, said bearing surfaces being of a width sufficient to prevent deformation of extensible material engaged thereby, a measuring element for each of said measuring wheels responsive to rotational movement thereof and indicating means energizable by said measuring elements for indicating in a single place the differential movement of said measuring wheels whereby the strain of the portion of said extensible material intermediate said measuring wheels is directly measured when said extensible material is elongated by said loading members.

2. In an apparatus of the class described including a pair of spaced loading members for elongating an extensible material suspended therebetween, means for measuring the strain imparted to an extensible material suspended between said loading members on elongation of said material comprising a pair of spaced rotatable measuring wheels intermediate said loading members, said measuring wheels being concentrically fixed to rotatable shafts in tandem alignment in a single plane perpendicular to the rotational axes of said shafts, the faces of said measuring wheels being engageable with said extensible material and of a width sufficient to prevent deformation of extensible material engaged thereby, a pair of spaced rotatable idler wheels in tandem alignment in a single plane parallel to the plane of said measuring wheels, said idler wheels being positioned, respectively, exactly opposite to said measuring wheels, each of said idler wheels being engageable with said extensible material on the side opposite the side with which the face of the corresponding measuring wheel is engageable, said idler wheels being of a width sufficient to prevent deformation of extensible material engaged thereby, means connected to said idler wheels for applying in the direction normal to said extensible material a force sufficient to hold said extensible material in non-slipping contact with said faces of said measuring wheels, a measuring element fixed to each of said shafts and indicating means energizable by said measuring elements on rotation of said shafts for indicating in a single place the differential movement of said measuring wheels whereby the strain of the portion of said extensible material intermediate said measuring wheels is directly measured when said extensible material is elongated by said loading members.

3. In an apparatus of the class described including a pair of spaced loading members for elongating an extensible material suspended therebetween, means for measuring the strain imparted to an extensible material suspended between said loading members on elongation of said material comprising a pair of spaced rotatable measuring wheels intermediate said loading members, said measuring wheels being in tandem alignment in a single plane perpendicular to the rotational axes thereof and having faces engageable with said extensible material, said faces being of a width sufficient to prevent deformation of extensible material engaged thereby, a pair of spaced rotatable idler wheels in tandem alignment in a single plane parallel to the plane of said measuring wheels, said idler wheels being positioned, respectively, exactly opposite to said measuring wheels, each of said idler wheels being engageable with said extensible material on the side opposite the side with which the face of the corresponding measuring wheel is engageable, said idler wheels being of a width sufficient to prevent deformation of extensible material engaged thereby, means connected to said idler wheels for applying in the direction normal to said extensible material a force sufficient to hold said material in non-slipping contact with said faces of said measuring wheels, a measuring element for each of said measuring wheels responsive to rotational movement thereof and indicating means energizable by said measuring elements for indicating in a single place the differential movement of said measuring wheels whereby the strain of the portion of said extensible material intermediate said measuring wheels is directly measured when said extensible material is elongated by said loading members.

CHARLES HOWARD ADAMS.

References Cited in the file of this patent

UNITED STATES PATENTS

| Number | Name | Date |
|---|---|---|
| 941,359 | Cowen | Nov. 30, 1909 |
| 1,015,305 | Fentzloff | Jan. 23, 1912 |
| 1,279,340 | Hayes et al. | Sept. 17, 1918 |
| 2,060,233 | Mathey | Nov. 10, 1936 |
| 2,189,775 | Bleakney | Feb. 13, 1940 |
| 2,197,196 | Schlup | Apr. 16, 1940 |
| 2,356,763 | Keinath | Aug. 29, 1944 |
| 2,441,283 | O'Hara | May 11, 1948 |